United States Patent [19]

Dhawan et al.

[11] Patent Number: 5,271,064
[45] Date of Patent: Dec. 14, 1993

[54] APPARATUS AND METHOD FOR SMOOTHING REGIONS AND ENHANCING EDGES IN GRAY SCALE IMAGES

[75] Inventors: Atam P. Dhawan; Thomas E. Dufresne, both of Cincinnati, Ohio

[73] Assignee: University of Cincinnati, Cincinnati, Ohio

[21] Appl. No.: 715,455

[22] Filed: Jun. 14, 1991

[51] Int. Cl.$^5$ .............................................. G06K 9/40
[52] U.S. Cl. ...................................... 382/54; 382/22; 382/27
[58] Field of Search ..................... 382/6, 22, 27, 49, 54

[56] References Cited

U.S. PATENT DOCUMENTS

| | | | |
|---|---|---|---|
| 3,701,095 | 10/1972 | Yamaguchi et al. | 382/49 |
| 4,743,097 | 5/1988 | Johnson et al. | 350/337 |
| 4,783,840 | 11/1988 | Song | 382/54 |
| 4,825,297 | 4/1989 | Fuchsberger et al. | 382/54 |
| 4,827,533 | 5/1989 | Tanaka | 382/27 |
| 4,853,794 | 8/1989 | Fukumoto et al. | 382/54 |
| 4,907,288 | 3/1990 | Shimoni | 382/54 |
| 4,941,190 | 7/1991 | Joyce | 382/54 |
| 5,031,227 | 7/1991 | Raasch et al. | 382/22 |
| 5,038,388 | 8/1991 | Song | 382/54 |
| 5,091,972 | 2/1992 | Kwon et al. | 382/49 |

OTHER PUBLICATIONS

Low-Level Image Processing and Edge Enhancement Using a Self Organizing Neural Network, Atam Dhawan and Thomas Dufresne, Proc. Int. Joint Conf. in Neural Networks, vol. 1, Jun. 17-21, 1990.
Image Restoration Using a Neural Network, Jul. 1988, IEEE Transactions on acoustics, speech, and signal processing, vol. 36 No. 7.
Theory of edge detection, Feb. 22, 1979, D. Marr and E. Hildreth, Proceedings of Royal Society of London, vol. 27.
Complete Discrete 2-D Gabor Transforms by Neural Networks for Image Analysis and Compression, John G. Daugman, IEEE Transactions On Acoustics, Speech, and Signal Processing, vol. 36, No. 7, Jul. 1988.
Detection of Intensity Changes with Subpixel Accuracy Using Laplacian-Gaussian Masks, Andres Huertas et al., IEEE Transactions on Pattern Analysis and Machine Intelligence, Sep. 1986.
Layered Neural Nets for Pattern Recognition, Bernard Widrow, et al IEEE Transactions on Acoustics, Speech, and Signal Processing vol. 36, No. 7, Jul. 19, 1988.
Analysis of the Process of Visual Pattern Recognition by the Neocognitron, Kunihiko Fukushima, Neural Networks, vol. 2, 1989.

*Primary Examiner*—David K. Moore
*Attorney, Agent, or Firm*—Wood, Herron & Evans

[57] ABSTRACT

An apparatus and method for enhancing image data elements used to form a gray scale image are disclosed. The apparatus includes an adaptive neighborhood mask that is applied to a group of data image elements centered about a selected pixel to segregate the elements into center and surround regions about the selected element or pixel. The mask further modifies the elements with weighting factors to derive a contrast vector for the selected data elements in the adaptive neighborhood. This vector is compared to a smoothing window and a pair of edge enhancement windows to determine whether the selected element requires smoothing or enhancement to more clearly define a surface or an edge, respectively. If the element requires smoothing or enhancing, its gray scale value is modified, otherwise it is not modified. The device performs this task for each data element. The enhanced data is analyzed to determine if further enhancement is possible and, if so, the process continues upon the adjusted data until the enhancement of the image data is maximized. An edge area selector may further enhance the image data elements by selecting a small group of elements at the unterminated end of a detected edge in the enhance image. The selected group is enhanced by adjusting the edge enhancement window or by changing the weighting factors and restoring the gray scale values of the selected group to their unenhanced values.

7 Claims, 6 Drawing Sheets

APPARATUS AND METHOD FOR SMOOTHING REGIONS AND ENHANCING EDGES IN GRAY SCALE IMAGES

FIELD OF THE INVENTION

This invention relates to the enhancement of images produced by gray scale elements.

BACKGROUND OF THE INVENTION

Apparatus that incorporate imaging techniques for constructing images from image data elements are well known. The simplest of these devices are character scanners that use character recognition techniques to "read" documents.

Character recognition devices analyze binary value images. Binary value images are made from data elements which can only have one of two values. When the image data element is at one value it represents the background and when it is at the second value it represents a portion of a character. Data elements having erroneous data values result from paper imperfections, smeared characters, or the like and are introduced when the document is scanned or "read" by the device. This means that data elements that should have the background value have the character portion value instead and vice-versa.

When the imaging device, such as a computer, attempts to match a known character pattern to the data elements having character portion values in the scanned image and a significant number of the elements have erroneous values, it fails to determine the character correctly and thus, cannot convert it into a data format, such as ASCII, for storage. Techniques have been developed by which the imaging device can analyze the image data elements and substantially eliminate or correct the erroneous data elements. The computer can then efficiently match the corrected data with stored patterns to accurately identify the characters for prompt data storage.

While character recognition techniques are useful in evaluating binary value images, such techniques are generally ineffective on gray scale images. Gray scale images are produced by data elements or pixels that can have one of several different data values. One end of the gray scale value range represents a black pixel while the other end of the gray scale value range represents a white pixel. The values in between represent slight gradations from one end of the gray scale value range to the other. Typically, a gray scale data element numerically ranges from 0 to 255.

Gray scale images are produced by receptor elements that convert radiant energy reflected from an object into analog electrical signals. These analog signals are digitized by A/D converters into gray scale values that correspond to the intensity or brightness of the radiant energy on the receptors. Sometimes faulty receptors or converters produce data elements having gray scale values that are not accurate. These erroneous data elements are sometimes called noise.

Image identification with gray scale images is more difficult because the object from which the sensory image data is received may have distinct regions within the periphery of the object. This means that the device not only must distinguish the object from the background but must also distinguish different regions of the object itself. Although the gray scale range is wide enough so the different regions and their boundaries are distinguishable by the imaging device when there is sufficient light, poor lighting conditions may cause the data elements to assume values within a narrow spectrum of the data range. Because the features are made of data elements that are very close in gray scale value to the elements of other features nearby, the boundaries between features are difficult to differentiate from one another. If the imaging device adjusts to these conditions by detecting edges at smaller differences in gray scale values between proximate pixels, it begins to detect edges from the inaccurate data elements caused by the faulty components that are slightly different than the accurately produced values nearby. Thus, the device produces an image with features not really present in the object and the identification of the object becomes difficult, if not impossible, by present methods.

One known gray scale imaging technique used to enhance the data elements in a gray scale image determines the energy of the image data elements and compares it to a constrained error function to correct data elements in the image. This technique has proven successful for blurred images in good lighting conditions. Blurred images are a somewhat simpler case than images produced in poor light since they have erroneous data elements that are generally uniformly distorted about the correct value. Additionally, while a feature may be blurred it is not obscured. Noisy image data resulting from poor lighting conditions are not uniformly distorted and the shadows created by the poor light tends to hide features. These differences make the blurred image resolving techniques marginally useful for poor lighting conditions. What is needed is a method for correcting or enhancing data elements generated from poor lighting conditions to reveal features within shadows.

Poor lighting conditions also apply to medical images formed by radiographic or x-ray techniques. Poor lighting in such applications arise from radiation input levels focused on one area of the body that are sufficient to provide image details for the region of focus but are insufficient to provide imaging details for neighboring areas. One way to eliminate this problem is to increase the radiation level, however, this may harm tissue in the focus area from radiation overexposure. What is needed is a method for enhancing the image data without increasing the radiation exposure of the patient.

One method for enhancing gray scale values is described in U.S. Pat. No. 4,941,190. The apparatus of that patent implements a non-sharp mask filter to enhance the data elements. A number of pixels centered about a selected pixel are retrieved and a center deviation is computed from the differences in gray scale values between each pixel and the selected pixel. The summation of these differences are used to determine a overall contrast for the pixels retrieved by the mask and the selected pixel value. Typically, the greater the contrast, the larger the correction or enhancement made to the element.

When a noisy element differs by several levels from the surrounding elements having approximately the same values, a large enough contrast is produced to cause the selected pixel value to be modified to further increase the difference that is needed to bring out an edge or boundary between features. For the noisy element, the correction makes the noise more prominent and creates a feature where one does not exist. What is needed is an imaging technique that rejects for correction or enhancement noisy or erroneous data elements that exist in an area with data elements having approximately the same gray scale values.

Another known gray scale imaging technique examines edges within an image and extrapolates the data elements near the detectable edges to extend them for further pattern recognition. This method uses a Laplacian gradient of the Gaussian function to evaluate zero crossings of the resultant second order derivative or, alternatively, a Gabor transform of the Gaussian function. These techniques are successful if there are a sufficient number of edges in the original data that the extrapolated edges from them correspond to stored patterns used for recognition. This technique, however, cannot accurately enhance or correct the image data elements underlying the extrapolated edge. What is needed is a method of enhancing image data elements proximate a detected edge to reveal edges in the image data.

SUMMARY OF THE INVENTION

The above referenced imaging problems for gray scale data elements have been solved by a device built in accordance with the principles of the present invention. The device of the present invention enhances the image data based upon a weighted analysis of the data elements about a selected element to form a contrast vector for a group of gray scale data elements within an adaptive neighborhood. The contrast vector is compared to a threshold to determine how the selected data element is modified. All the data elements are enhanced and the process is iteratively repeated until the image data is maximally enhanced.

More particularly, a device built in accordance with the principles of the present invention includes an adaptive neighborhood mask that is applied to a group of data image elements centered about a selected pixel to segregate the elements into center and surround regions about the selected element or pixel. The mask further modifies the elements with weighting factors to derive a contrast vector for the selected data elements in the adaptive neighborhood. This vector is compared to a smoothing window and a pair of edge enhancement windows to determine whether the selected element requires smoothing or enhancement to more clearly define a surface or an edge, respectively. If the element requires smoothing or enhancing, its gray scale value is modified, otherwise it is not modified. The device performs this task for each data element. The enhanced data is analyzed to determine if further enhancement is possible and, if so, the process continues upon the adjusted data until the enhancement of the image data is maximized. In a preferred embodiment of the present invention, this maximization is determined from the entropy level of the image data elements.

It is an object of the present invention to enhance data element values obscured by shadows on images produced in poor light. To accomplish this object, the device classifies each image data element as a surface or edge element by comparing the measured contrast vector for each element to threshold windows set for edges that need enhancement. The elements corresponding to the contrast vectors within these windows are adjusted to increase the differences between elements at edges, which produces sharper edges from the elements in the shadows. One advantage of finding features in shadows is the ability of the device to locate structures in radiographic images outside the focus area even though they are dimly radiated.

It is an object of the present invention to reject noisy or erroneous elements for enhancement that are anomalous in an otherwise constant contrast region. To this end, an adaptive neighborhood mask used to initially compute the contrast vectors and adjust the data elements has the weighting factors distributed throughout the mask so the contribution of the data elements in the center region to the contrast vector tend to balance the contribution of the elements in the surround region. This is done by making the center region of the mask, which has positive weighting factors, comparable in size to the surround region, which has negative weighting factors. This balanced mask typically reduces the contrast vector for the selected element having an erroneous value. The contrast vector is compared to a surface window and if the vector is within the window, the erroneous data element is modified to conform the value to its surrounding neighbors rather than to increase its difference with them. Thus, most erroneous elements fail to produce contrast vectors that result in enhancement of the noise associated with the element and some erroneous elements are smoothed into the surface surrounding them.

One advantage of the center size in the initial adaptive neighborhood mask is the smoothing of data elements near an edge data element. The center region contribution and surround region contribution to the contrast vector tend to balance one another such that the contrast vectors for the surface elements lie within the smoothing window. As a result, the surface elements transition smoothly towards the enhanced edge. This prevents the edge elements from being enhanced to such a degree that they "leap" from the surface and thereby give the erroneous appearance of being another feature of the object.

Another object of the present invention is to enhance image data elements along detected edges in the image. To this end, the weighting factors are selected so the contrast values for each element indicate which ones lie along an edge and the propagation direction of the edge. A small group of elements are then selected proximate to an unterminated end of an edge in the propagation direction of the edge. This selected group is further enhanced by comparing their contrast vectors with modified edge and surface windows to bring out edges in the selected group from the data elements that had contrast vectors below the previous enhancement window.

One advantage of the further enhancement of this selected group is the reduced likelihood that noisy data is enhanced since the selected group is relatively small and the elements did not have sufficiently differing values to produce vectors in the previous enhancement window. Another advantage of this method is its adaptability to interfacing the device to a pattern recognition system that produces feedback for adjusting the modification of the edge enhancement window.

A further object of the present invention is to reduce the computational load for determining the enhancement of the data and the detection of edges within the data. To this end, the absolute value of the symmetrical weighting factors are normalized to the range of 0 to 1 to reduce the magnitude of the computations. The factors are also selected to provide both edge detection information and contrast vectors in a single computation to alleviate the need for two different computations and the additional time to perform them.

These and other objects and advantages of the present invention shall be made apparent from the accompanying drawings and the description thereof.

DETAILED DESCRIPTION OF THE INVENTION

Figure 1:
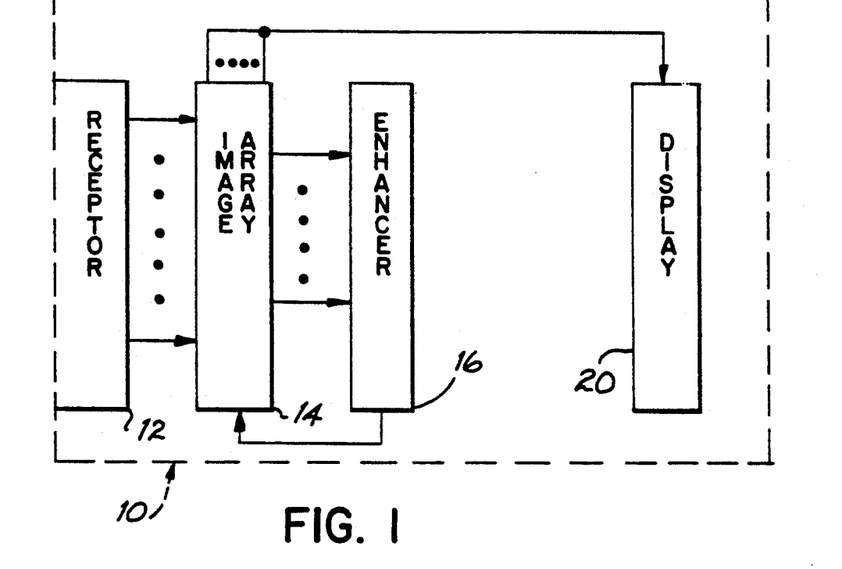
FIG. 1 is a block diagram of a device constructed in accordance with the principles of the present invention.

A block diagram of a device incorporating an image enhancer constructed in accordance with the principles of the present invention is shown in FIG. 1. The imaging device 10 includes a radiation receptor 12 which generates image data elements or pixels that are placed in an image data array 14. The image data elements within array 14 are analyzed and iteratively enhanced by an enhancer 16. The reorganized image data elements are returned to array 14. After the image data elements have been maximally enhanced, the enhanced data elements are used to generate electrical signals that produce the enhanced image on display 20.

Radiation receptor 12 includes an array of electromagnetic sensors which convert radiation energy that impinges upon the sensors into electrical signals that are proportional to the energy or intensity of the sensed radiation. For example, receptor 12 may be an array of photomultiplier tubes or photoreceptors. These devices are used, respectively, in x-ray imaging machinery and industrial line robotics. Thus, a device built in accordance with the principles of the present invention is not limited to any particular type of imaging application but rather is applicable to any image formed by multiple element radiation receptors that convert sensed radiation into discrete quanta for image production. In the preferred embodiment of the present invention, receptor 12 is interfaced to electronic components, such as A/D converters, to digitize the electrical signals.

An example of a setup to produce digitized data for enhancement is a Hitachi CCD DK-7000 camera controlled by a CU-7000 Camera Control Unit that provides the image analog data to a digitizer card in a microcomputer utilizing an Intel 80286 microprocessor. Such data generation setups are well known within the art.

Figure 2:
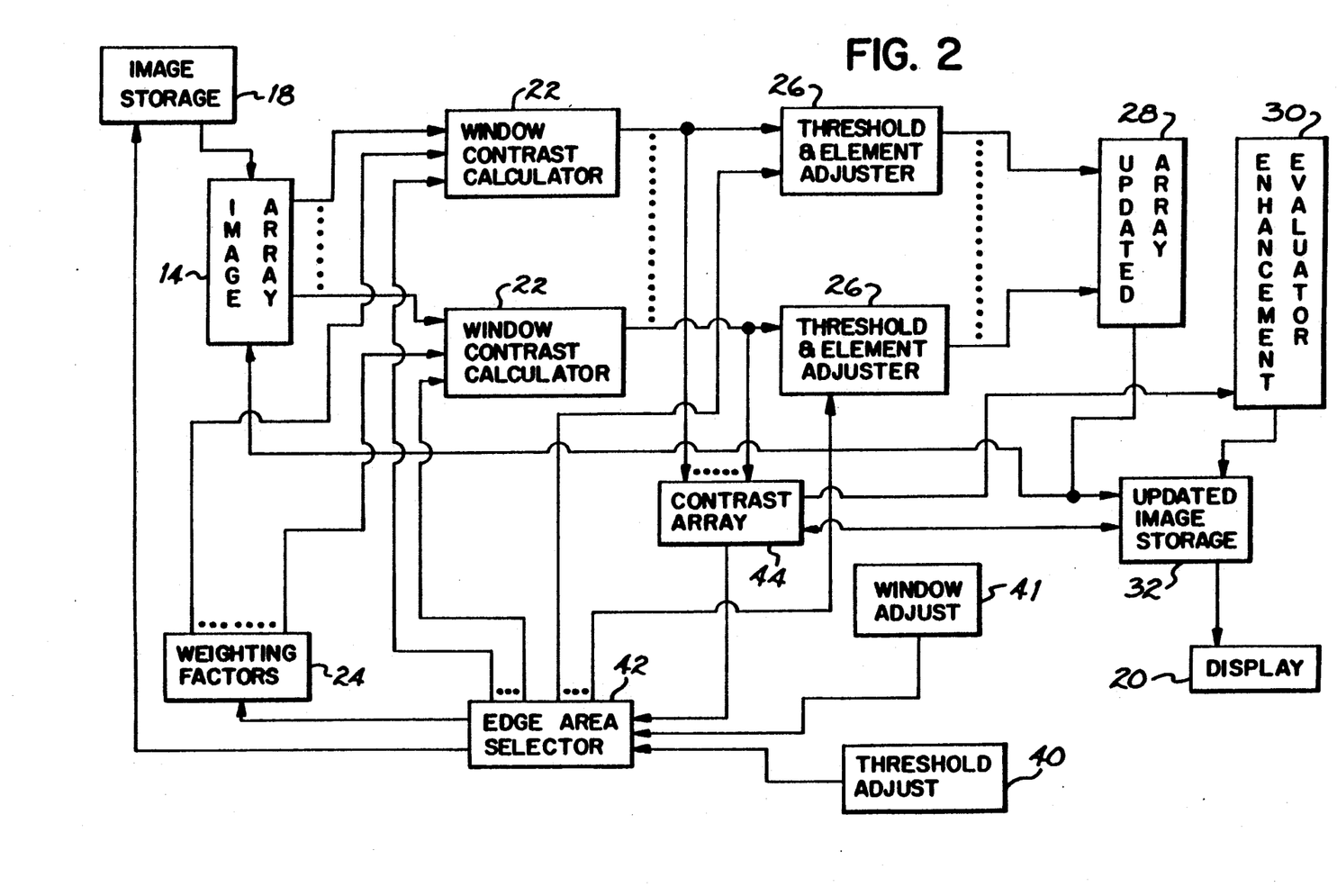
FIG. 2 is a block diagram of the image enhancer shown in FIG. 1.

The digitized data produced from the received image is stored in array 14 for enhancement and a copy of this unenhanced image data is also archived in image storage unit 18 (FIG. 2). Array 14 is a volatile memory device having its address space mapped so each addressable location holds the gray scale value of an image element that corresponds to a radiation sensor in receptor 12. These image elements or pixels typically have a value which ranges from 0 to 255 that represent levels of radiation intensity from no energy to the maximum response of the sensor, although other data ranges are known and may be used.

A block diagram of enhancer 16 is shown in FIG. 2. Enhancer 16 is preferably constructed to process all the data elements in array 14 substantially simultaneously in a parallel manner. Each element is retrieved from the array with surrounding elements in accordance with a predetermined adaptive neighborhood mask by window contrast calculator 22. Calculator 22 uses weighting factors from a weighting factor memory 24 to modify the data elements and compute a contrast vector for each data element. The contrast vector is provided to threshold and element adjuster 26, which determines whether the center data element in the window is a surface element to be smoothed, an edge element to be enhanced, or an element that currently does not require adjustment. Based on the classification of the center data element, the data element is adjusted and stored within an updated image array 28. The data elements in the updated array are fed back to array 14 and also stored in update image storage unit 32.

Enhancement evaluator 30 measures the enhancement of the data in updated array 28 and outputs a signal to storage unit 32 if the data enhancement has been maximized. This signal outputs the updated image with the most enhanced data from storage unit 32 elements to display 20 for inspection. Otherwise, the enhancement process continues iteratively. The remaining components provide feedback adjustments to the enhancement process and are discussed below.

The parallel operation depicted in FIG. 2 may be performed in a serial fashion. In a serial processing scheme, the data elements are enhanced one at a time. A data element is randomly selected, all adaptive neighborhood elements retrieved, a contrast vector calculated and compared to the threshold windows, and the selected data element adjusted as discussed above. Once updated, another element is randomly selected and adjusted until all of the data elements have been adjusted. The enhancement of the data is measured and another iterative process is performed if enhancement has not been maximized. This serial processing requires more time than the parallel method, but it can be performed in general purpose computer equipment rather than dedicated hardware such as a parallel processor.

The adaptive neighborhood mask used by calculator 22 retrieves those data elements surrounding the selected element that provide information as to whether the selected element lies on an edge or boundary of a surface or on the surface itself. In the preferred embodiment of the invention, the elements in a 5 element by 5 element area centered about the selected element are retrieved from array 14 as the adaptive neighborhood of the selected element, although other dimensions may be used for the size and shape of the adaptive neighborhood.

Figure 4A:
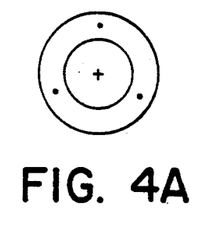
FIG. 4A is a graphical depiction of the adaptive neighborhood element mask used in the image enhancer of the present invention.
Figure 4B:
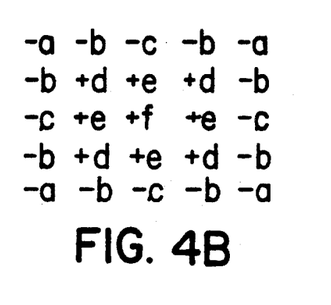
FIG. 4B is a pictorial representation of the mask shown in FIG. 4A.
Figure 5A:
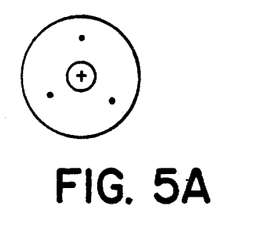
FIG. 5A is a graphical depiction of an adaptive neighborhood element mask which may be used to reveal details from data elements not previously enhanced.

The retrieved elements are segregated into a center region and a surround region by the mask. A graphic depiction of the adaptive neighborhood mask used in the initial enhancing of a selected element is shown in FIG. 4A and the numerical representation of the mask is shown in FIG. 4B. An adaptive neighborhood mask used in subsequent feedback processing that is discussed below is depicted and numerically represented in FIGS. 5A and 5B, respectively. Note that the center region of the initial mask in FIGS. 4A and 4B is larger than that shown in FIGS. 5A and 5B. The larger center region of the mask is used to enhance prominent features of the image without enhancing noise in the data elements while the smaller center region is used to enhance image details after the noise data is attenuated by the initial processing of the image data elements.

Another function of the center and surround regions in the mask of FIG. 4B is the prevention of edge artifacts in the image. If the enhancement of the edge elements alone occurred, the edge elements may be so adjusted that the edges appear to "leap" from the surface. By segregating the adaptive neighborhood mask into center and surround regions, the contribution of each region to the contrast vector for surface elements tend to balance and, consequently, drive the contrast vector into the smoothing window. As a result, the data elements for surfaces smoothly transition to the enhanced edges to prevent the edge artifacts.

Figure 5B:
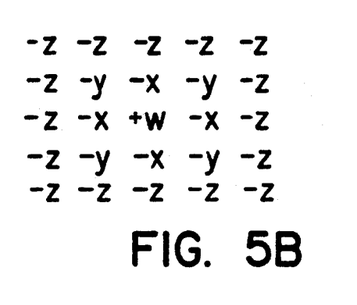
FIG. 5B is a pictorial representation of the mask shown in FIG. 5A.

The coefficients in the adaptive neighborhood masks of FIGS. 4B and 5B are called weighting factors. The weighting factors of FIGS. 4B and 5B are determined by computing a gradient of the Gaussian space for the adaptive neighborhood. In the preferred embodiment of the present invention, this gradient is calculated as the Laplacian of the Gaussian space. The functional formula for this calculation is:

$$\nabla^2 G(x,y) = \frac{1}{2\pi\sigma^4}\left(2 - \left(\frac{(x^2 + y^2)}{\sigma^2}\right)\right) \cdot \exp\left[-\frac{(x^2 + y^2)}{2\sigma^2}\right]$$

The terms x and y in the formula indicate the relative difference for each order of proximity of the data elements in the adaptive neighborhood to the selected element and the value $\sigma$ represents one standard deviation. The functional formula may be decomposed into two separable filters that reduce the computational requirements for determining the coefficients as is well known in the art. For example, such a computation is explained in *Detection of Intensity Changes with Subpixel Accuracy Using Laplacian-Gaussian Masks* by A. Huertas and G. Medioni in IEEE Transactions on Pattern Analysis and Machine Intelligence, Vol: PAMI-8, No. 5, September 1986.

In a preferred embodiment, a floating point processor is used to compute the weighting factors using the separable filters and the absolute value of the factors are normalized for the range of 0 to +1, with +1 being the coefficient of the selected center data element. As long as a floating point processor is used, the normalization of the factors reduces the magnitude of the contrast link computations and improves the resource utilization efficiency for processing the data elements. In the preferred embodiment of the present invention, a standard deviation of 2 about the Laplacian of the Gaussian function has been determined to be an optimal distribution for the weighting factors, although standard deviations of up to 9 are useful. Although the Laplacian of Gaussian space function is preferably used to calculate values for the weighting factors, other functions may be used such as a Gabor transform.

The weighting factors retrieved by contrast calculator 22 are multiplied by the retrieved data elements and added to the weighted center data element to form $M-1$ contrast links, where M is the number of elements in the selected adaptive neighborhood. The formula for determining each contrast link is:

$$C_i = W_c G_c + W_i G_i$$

where $C_i$ is the contrast link between, $G_c$, the gray scale level of the center element, and $G_i$ the gray scale level of the ith element in the neighborhood, $W_i$ is the weighting factor for the ith element and $W_c$ is the weighting factor for the center element. These contrast links are a relative measurement of the contrast or difference in intensity between each of the data elements in the adaptive neighborhood and the centermost data element.

Figure 3:
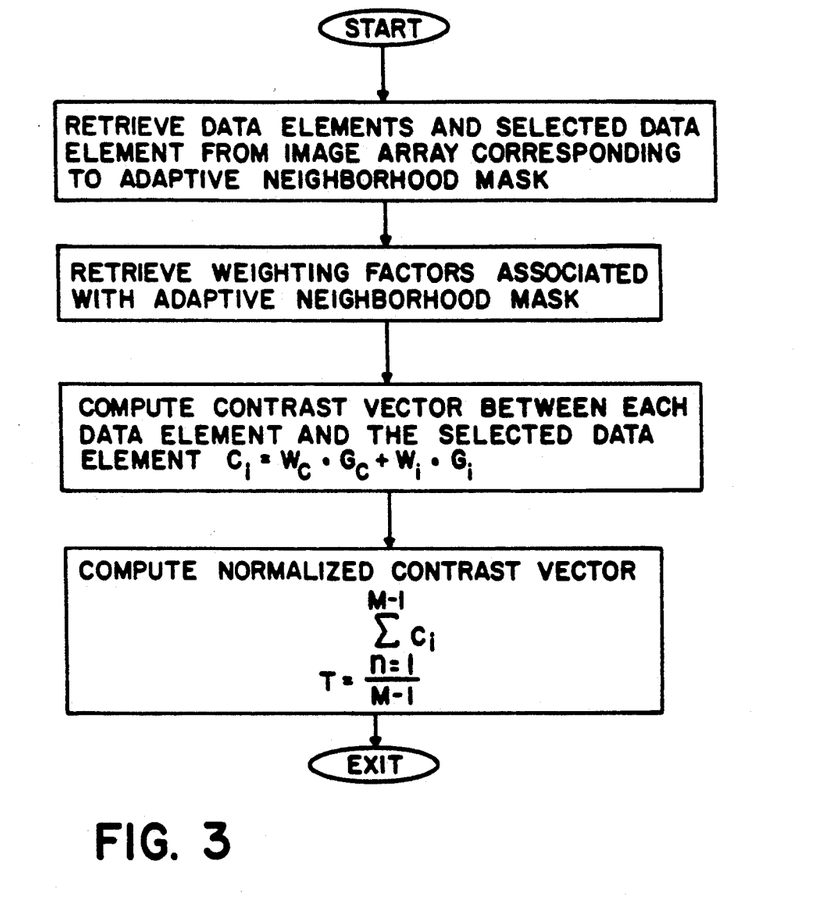
FIG. 3 is a flowchart of the operation of the window contrast calculator in the preferred embodiment of the present invention.

The contrast links are summed to form a contrast density which is normalized by dividing this density by $M-1$. The formula for determining the normalized density is:

$$T = \frac{\sum_{i=1}^{M-1} C_i}{M-1}$$

where T is the normalized density, $C_i$ is the ith contrast link and M is the number of elements in the adaptive neighborhood. The normalized contrast density or contrast vector is indicative of the degree of contrast in the neighborhood of the selected center data element. The above described operation of the window contrast calculator is shown in the flowchart of FIG. 3.

Figure 6:
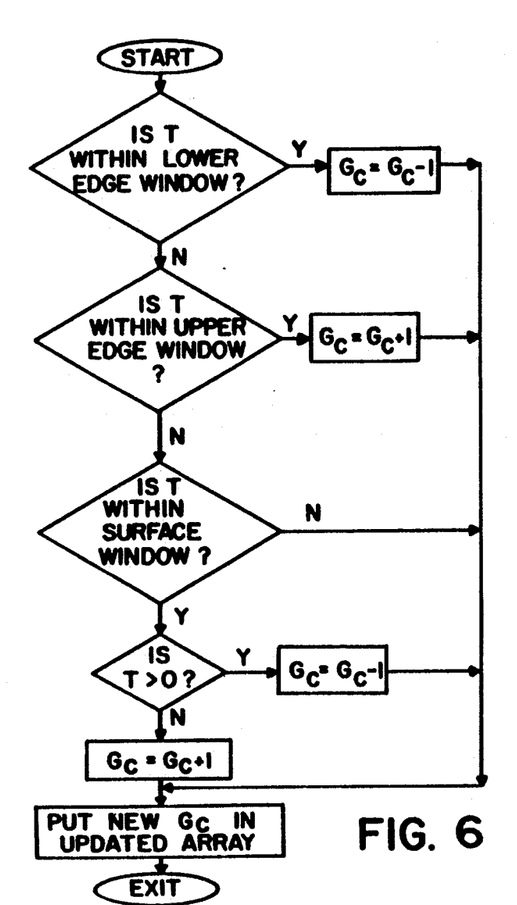
FIG. 6 is a flowchart of the operation of the threshold and element adjusters in the preferred embodiment of the present invention.
Figure 7:
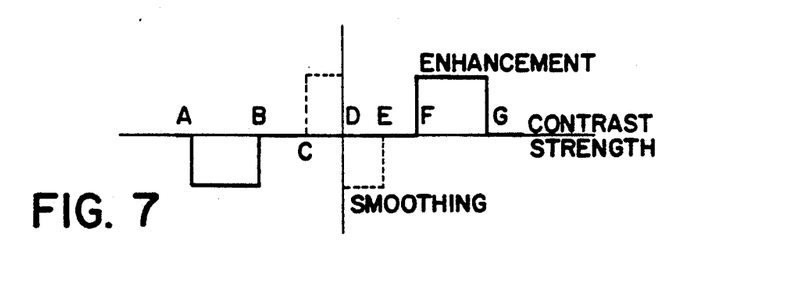
FIG. 7 is a graphic representation of the enhancement and smoothing windows along the contrast vector range.

The operation of threshold and element adjuster 26 is depicted in the flowchart of FIG. 6. The normalized contrast vector, T, is compared to the upper and lower limits of a lower edge window, the upper and lower limits of a upper edge window, and the upper and lower limits of a surface window. These windows are graphically depicted in FIG. 7. FIG. 7 shows an X axis which denotes the magnitude of the contrast vector. The origin of the axis or point D indicates that the entire adaptive neighborhood is a smooth planar surface without any edges since there is no contrast between the adaptive neighborhood elements and the selected data element. Any contrast vector between points D and C and between points D and E are considered to be practically zero and thus indicative of a surface area. When the magnitude of a contrast vector is in the window defined by points A and B or the window defined by points F and G, the contrast vector is great enough to indicate the selected data element lies on an edge of the image that needs enhancement.

Continuing with the flow in FIG. 7, once the contrast vector is determined to be within one of the windows, the gray scale value of the selected data element is adjusted. In the preferred embodiment of the invention, a contrast vector within the lower edge window defined by points A and B causes element adjuster 26 to reduce the selected center data element by one gray scale level and a contrast vector within the upper edge window defined by points F and G results in the addition of one to the selected element. This adjustment tends to enhance the sharpness of the edge in the neighborhood. Within the surface window, a negative vector between points C and D causes an addition of one to the data element while a positive vector between points D and E results in a subtraction of one from the data element. This adjustment reduces contrast in the adaptive neighborhood and smooths the surface represented by the data elements. In the preferred embodiment of the present invention, the gray scale values are adjusted by one level per iteration, although other adjusted values may be used.

The points A, B, C, D, E, F, and G are derived from empirical data developed from test objects that approximate the shapes to be observed by imaging device 10. The empirical establishment of these windows is performed by setting the edge and surface windows at default values and verifying whether the enhanced image conforms to the test object correctly. After each test run, the windows are enlarged or shifted with respect to the origin to determine whether enhancement of edges and smoothing of surfaces within the the image are improved. In the preferred embodiment of the present invention, the default values for the upper and lower edge enhancement windows are set at ±0.4 to ±0.8 and the surface smoothing window is set at −0.3 to +0.3 on the normalized contrast vector range.

Figure 8:
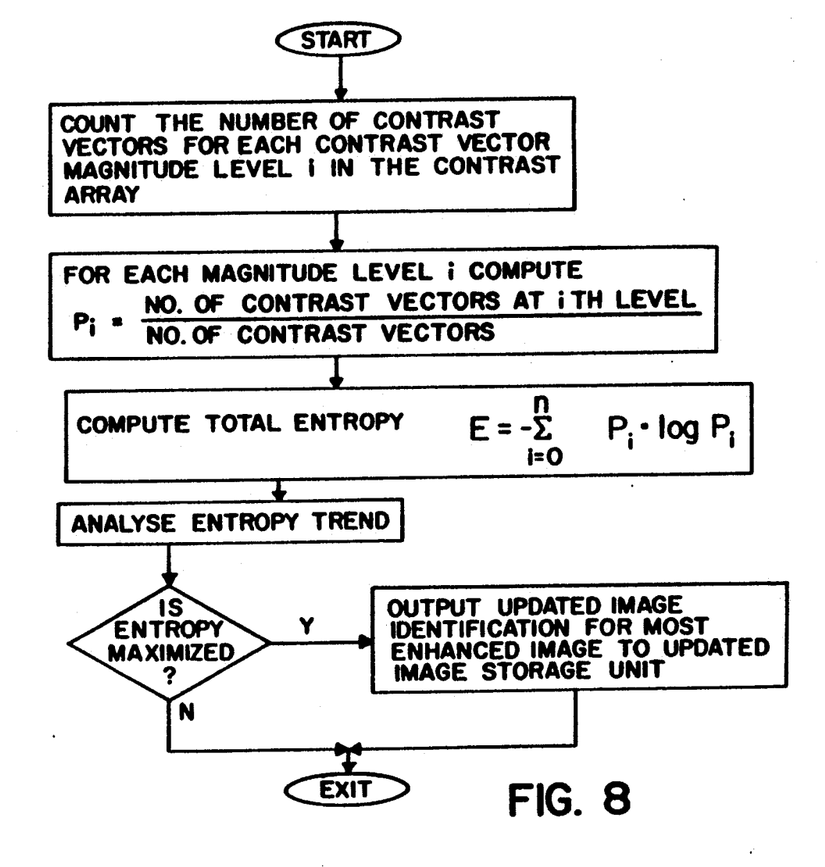
FIG. 8 is a flowchart for image data enhancement evaluation.

Following adjustment of all of the data elements, enhancement evaluator 30 determines whether the enhancement of the image data elements has been maximized. The operations performed by the enhancement evaluator are shown in the flowchart of FIG. 8. In the preferred embodiment of the present invention, this determination is made by evaluating the entropy of the data. Entropy is measured according to the following formula:

$$E = - \sum_{i=1}^{n} P_i \times \log P_i$$

where $$P_i = \frac{\text{No. of contrast vectors at the ith magnitude}}{\text{Total No. of contrast vectors}}$$

Once the entropy of the updated array is measured, the updated elements are archived in updated image storage unit and routed to array 14. The entropy levels for the last several iterations are analyzed to determine the trend of the data entropy. When the trend indicates a continuing decline from a maximum value, enhancement of the data is maximized and evaluator 30 outputs an image identifier to the image storage unit. Although entropy is the preferred criteria for terminating the enhancement of the image data, other measurements may be used such as terminating the enhancement when less than 10% of the data elements were changed on the previous adjustment iteration.

Entropy and the 10% element change condition are enhancement terminating criteria that are termed global since they are determined by considering all the contrast vectors or data elements in an array. Other terminating criteria may be used that are local, that is, they are measured from a value derived from a subset or small neighborhood within the array. Such criteria may be useful in terminating the further enhancement of selected pixels discussed below.

Figure 9A:
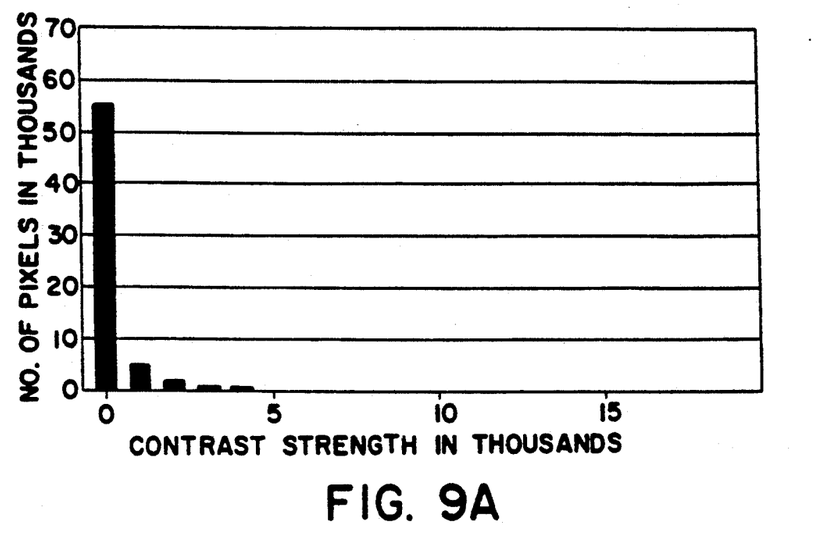
FIG. 9A is a histogram of the distribution of the contrast vectors for all data elements prior to enhancement.
Figure 9B:
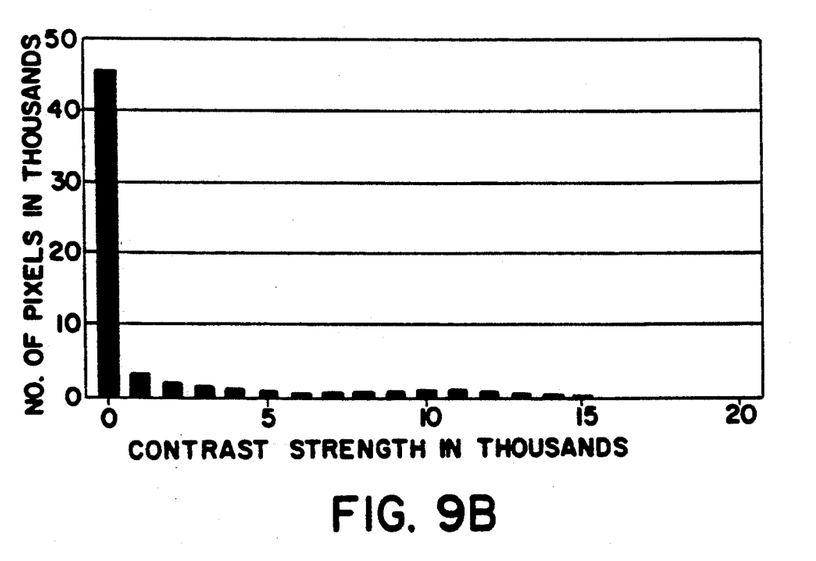
FIG. 9B is a histogram of the distribution of the contrast vectors for all data elements after image enhancement; and, FIG. 10 is a flowchart of the operation of the edge area selector shown in FIG. 2.

FIG. 9A represents a histogram of the contrast vectors for each of the image data elements prior to enhancement and FIG. 9B represents a histogram of the contrast vectors for each of the image data elements after enhancement. The histogram of FIG. 9A shows that the poor lighting conditions under which the image data elements were generated resulted in a distribution of contrast vectors in a very narrow magnitude range. This indicates the edges of the object in the image are difficult to discern as well as the correct smoothness or texture of the surfaces. The enhanced image histogram of FIG. 9B shows the distribution of contrast vectors for the adjusted data elements that extend further over the contrast vector range and demonstrates that the features of the image are more perceptible than those in the unenhanced image.

The iterative reorganization or adjustment of the image data elements modifies the gray scale values of the data elements to sharpen the edges and smooth the surfaces within the image generated from the adjusted data. The image identifier from evaluator 30 is used by image storage unit 32 to retrieve the maximally enhanced image and its corresponding contrast vectors output them to display 20 and contrast array 44, respectively. Display 20 may be a visual display device or another image array in an artificial intelligence or expert knowledge system that utilizes the image, such as a robotic system. The visual display may be of a type used in medical imaging to produce a tomographic display for a medical professional. Upon viewing the image, the professional may observe areas where details do not appear fully developed and the expert system may not be able to correlate any of its "learned" patterns to the enhanced data. In either case, the person or system may actuate the threshold adjust module 40 by entering a command or presenting a signal to the module.

The threshold adjust module 40 transmits a signal to edge area selector 42. Edge area selector 42 retrieves the contrast vectors for the maximally enhanced image from contrast array 44. Because contrast vectors in the preferred embodiment of the present invention relate to the second order derivative of the image data elements, they may be searched for zero crossing points between adjacent pixels. Such a zero crossing is indicated when adjacent values in the array have opposite co-efficient signs. These zero crossing points are used to identify the location of the edge elements and these are then connected by edge area selector 42 to determine known edges. Such edge searching and locating techniques are well known within the art. For example, *Computer Vision* by Dana Ballard and Christopher Brown discuss edge fitting techniques similar to those used in the device built in accordance with the principles of the present invention in the sections entitled "Finding Local Edges" and "Edge Following as Graph Searching" of chapters 3 and 4.

Figure 10:
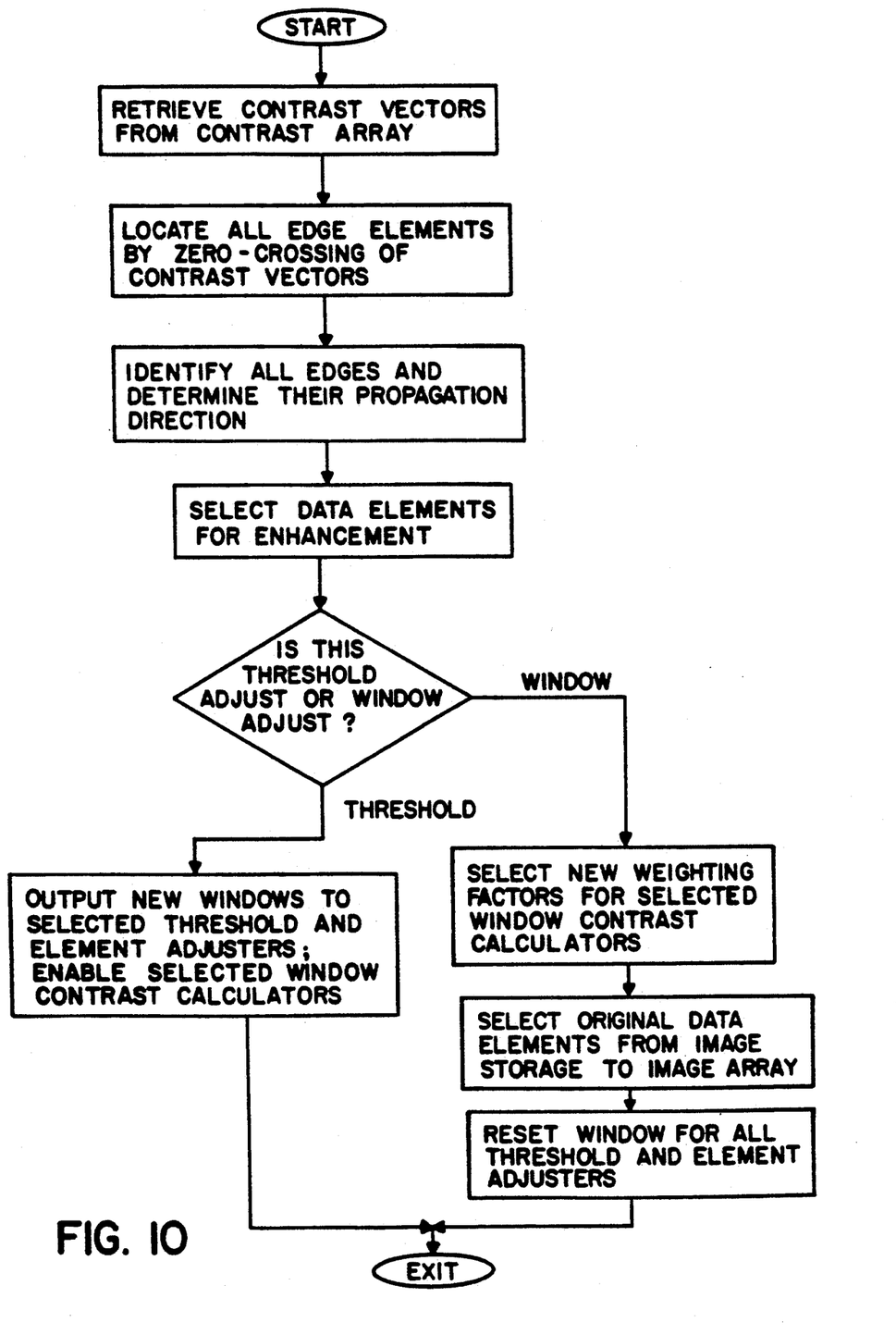

Once edge area selector 42 has determined the edges currently detected in the image, it locates pixels proximate any unterminated end of an edge in the propagation direction of the edge. Propagation of an edge is determined by analyzing the magnitude of the second order derivative or a predetermined number of contrast vectors in both the horizontal and vertical direction. In the preferred embodiment of the present invention, the predetermined number of contrast vectors analyzed for determining propagation is 3, although other numbers could be used. The technique for determining propagation direction from contrast vectors and other methods for determining the same are discussed in the above reference by Ballard and Brown. In the preferred embodiment of the present invention, the data elements located in a thirty degree arc extending in the propagation direction of the edge from the unterminated end of the edge are selected for further enhancement. Signals from edge selector 42 are generated that enable the window contrast calculators for the selected elements and disable the remaining window contrast calculators. In a similar manner, signals are provided to the threshold and element adjuster modules for the selected data elements that shift the edge enhancement windows towards the surface window.

Image array 14 is loaded with the maximally enhanced image data elements from the updated image storage unit. Enhancement processing is initiated and performed as previously discussed except only those data elements having enabled window contrast calculators 22 have their contrast vectors calculated and compared to the reduced edge window thresholds. As the selected data elements are adjusted they are placed in the updated array and enhancement evaluator 30 continues to measure the entropy of the data. When the entropy is determined to be maximized with the reduced or relaxed thresholds, the identifier for the maximally enhanced image is output to the updated image storage and the maximally enhanced data elements are provided to display 20.

Upon reviewing display 20, the person or system utilizing the data may determine that the further enhanced image has indicated additional areas of interest. A command or signal may be generated to activate the window adjust operation of device 10. The window adjust signal from window adjust module 41 is provided to edge area selector 42 and the latest maximally enhanced image data elements are loaded into image array 14 as are the corresponding contrast vectors into the contrast array.

Edge area selector 42 again examines contrast array 44 containing the contrast vectors corresponding to the latest maximally enhanced image data to determine the detected edges and to select data elements for further edge investigation. For the selected data elements, all threshold and element adjusters 24 are set to the original edge and surface window limits and the window contrast calculators 22 for the selected data elements are enabled. Edge area selector 42 loads the original data elements for the selected data element locations into image array 14.

Edge area selector 42 also causes weighting factors memory 48 to output the weighting factors that correspond to the adapted neighborhood mask shown in FIG. 5B to the enabled contrast calculators 22. This new adaptive neighborhood mask has a tighter center area that modifies the contrast vector calculations so more edge detail may be detected from the selected data elements. Alternatively, an adaptive neighborhood mask may contain weighting factors that are asymmetrical about the center data element. Such masks are direction oriented and are useful for edge detection and extropolation when they are oriented in the propagation direction of the detected edge. A Gabor transform is an example of such an asymmetrical mask.

The enhancement process continues as previously described with evaluator 30 continuing to evaluate each enhancement iteration to determine which updated data elements are maximally enhanced. Upon identification of this maximally enhanced updated image, an identifier is output to storage unit 32 so the maximally enhanced data may be output to display 20.

The threshold adjust and window adjust operations of device 10 provide a focusing feature for the device without processing the previously enhanced elements of the prior image. This is made possible from the selective element processing and selective window placement of the edge enhancement and surface windows. These features may be selectively activated to reduce the processing time for the image enhancement if details are not enhanced in the first iterative modification of the data elements. Further, the computer resources for performing the window adjust and threshold adjust operations are efficiently utilized because only the data elements selected by edge area selector 42 are processed. This reduction in the number of data elements processed is especially advantageous when the data elements are processed in a serial manner.

A device incorporating the principles of the present has been implemented on a SUN4 workstation that receives the digitized data from the INTEL microprocessor based system over an ETHERNET Network and controls a PIXAR pipeline image processer to implement the image enhancer and display. One skilled in the art may appreciate that the implementation of the principles of the present invention are not limited to such a scheme, but may be performed on a general purpose computer system, a parallel processor system, or may be implemented on VLSI circuit.

While the invention has been discussed with regard to robotic imaging and medical imaging, it is not limited to such applications. Rather any image capable of multilevel pixel representation may be enhanced by the method and apparatus described in this application. It should be understood that the words which have been used are words of description rather than limitation and that changes and variations may be made without departing from the spirit or scope of the appended claims.

What is claimed is:

1. A device for enhancing a plurality of image data elements stored in an image array, each of said data elements having a gray scale value, said device comprising:

means for selecting one of the plurality of image data elements stored in the image array;

means for retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

means for summing the product of said selected data element and said one weighting factor corresponding with said selected data element and the product of one of said retrieved data elements and said one weighting factor corresponding with said selected retrieved data element to form a contrast link;

means for summing all said contrast link to form a contrast vector;

means for adjusting the gray scale value of said selected data element by 1) adding a predetermined quantum to the gray scale value of said selected data element when a) said contrast vector is greater than zero and within said edge enhancement window and b) said contrast vector is less than zero and within said smoothing window and 2) by subtracting said predetermined quantum from said selected data element when c) said contrast vector is less than zero and within said enhancement window and d) said contrast vector is greater than zero and within said smoothing window;

means for measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

2. The device of claim 1 wherein said quantum is one gray scale level.

3. A device for enhancing a plurality of image data elements stored in an image array, each of said data elements having a gray scale value, said device comprising:

means for selecting one of the plurality of image data elements stored in the image array;

means for retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

means for summing the product of said selected data element and said one weighting factor corresponding with said selected data element and the product of one of said retrieved data elements and said one weighting factor corresponding with said selected retrieved data element to form a contrast link;

means for summing all said contrast link to form a contrast vector;

means for adjusting the gray scale value of said selected data element when said contrast vector is within one of an edge enhancement window and a smoothing window;

means for detecting edges and a propagation direction associated with said detected edge from contrast vectors formed for each of the data elements in the image array;

means for selecting a group of data elements proximate an unterminated end of said detected edge;

means for modifying said edge enhancement window with respect to said smoothing window;

means for enabling said contrast link forming means, said contrast vector forming means and said gray scale value adjusting means for said selected group of data elements;

means for measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

4. A device for enhancing a plurality of image data elements stored in an image array, each of said data elements having a gray scale value, said device comprising:

means for selecting one of the plurality of image data elements stored in the image array;

means for retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

means for summing the product of said selected data element and said one weighting factor corresponding with said selected data element and the product of one of said retrieved data elements and said one weighting factor corresponding with said selected retrieved data element to form a contrast link;

means for summing all said contrast link to form a contrast vector;

means for adjusting the gray scale value of said selected data element when said contrast vector is within one of an edge enhancement window and a smoothing window;

means for detecting edges and a propagation direction associated with said detected edge from contrast vectors formed for each of the data elements in the image array;

means for selecting a group of data elements proximate an unterminated end of said detected edge;

means for replacing said adjusted data elements with said unadjusted data elements corresponding to said adjusted elements;

means for changing said weighting factors to a second set of weighting factors corresponding to a second neighborhood adaptive mask;

means for enabling said contrast link forming means, said contrast vector forming means ad said gray scale value adjusting means for said selected group of data elements;

means for measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

5. A method for enhancing a plurality of image data elements stored in an image array, each of said data elements having a gray scale value, said method comprising:

selecting one of the plurality of image data elements stored in the image array;

retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

summing the product of said selected data element and said one weighting factor corresponding with said selected data element and the product of one of said retrieved data elements and said one weighting factor corresponding with said selected retrieved data element to form a contrast link;

summing all said contrast link to form a contrast vector;

adding a predetermined quantum to the gray scale value of said selected data element when a) said contrast vector is greater than zero and within said edge enhancement window and b) said contrast vector is less than zero and within said smoothing window;

subtracting said predetermined quantum from said selected data element when c) said contrast vector is less than zero and within said edge enhancement window and d) said contrast vector is greater than zero and within said smoothing window;

measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

6. A method for enhancing a plurality of image data elements stored in an image array, each of said data elements having a gray scale value, said method comprising:

selecting one of the plurality of image data elements stored in the image array;

retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

summing the product of said selected data element and said one weighting factor corresponding with said selected data element and the product of one of said retrieved data elements and said one weighting factor corresponding with said selected retrieved data element to form a contrast link;

summing all said contrast link to form a contrast vector;

detecting edges and a propagation direction associated with said detected edge from said contrast vectors formed for each of the data elements in the image array;

selecting a group of data elements proximate an unterminated end of said detected edge;

modifying said edge enhancement window with respect to said smoothing window;

performing said contrast link forming step, said contrast vector forming vector step and said gray scale value adjusting step for said selected group of data elements only;

measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

7. A device for enhancing a plurality of image data elements stored in an image array, each of said data elements having a gray scale value, said device comprising:

means for selecting one of the plurality of image data elements stored in the image array;

means for retrieving a group of image data elements from an area about and including said selected data element, said area being defined by an adaptive neighborhood mask, said adaptive neighborhood mask having a plurality of weighting factors, each one of said weighting factors corresponding to one of said data elements in said area;

means for summing the product of said selected data element and said one weighting factor corresponding with said selected data element and the product of one of said retrieved data elements and said one weighting factor corresponding with said selected retrieved data element to form a contrast link;

means for summing all said contrast link to form a contrast vector;

means for adjusting the gray scale value of said selected data element when said contrast vector is within one of an edge enhancement window and a smoothing window;

detecting edges and a propagation direction associated with said detected edge from contrast vectors formed for each of the data elements in the image array;

selecting a group of data elements proximate an unterminated end of said detected edge;

for replacing said adjusted data elements with said unadjusted data elements corresponding to said adjusted elements;

changing said weighting factors to a second set of weighting factors corresponding to a second neighborhood adaptive mask;

enabling said contrast link forming step, said contrast vector forming step and said gray scale value adjusting step for said selected group of data elements only;

means for measuring the enhancement of the gray scale values of said adjusted data elements in said array after each of said data elements in the image array have been selected by said selecting means, said measuring means generating a signal indicative that the enhancement of said adjusted data elements is maximized; and means for transferring said adjusted data elements to a display generator in response to said signal from said measuring means whereby the image produced by the display generator is enhanced.

* * * * *